United States Patent [19]

Gillet

[11] Patent Number: 5,031,973
[45] Date of Patent: Jul. 16, 1991

[54] SELF-PROPELLED MACHINE WITH FLEXIBLE CATERPILLAR TREAD UNDERCARRIAGE

[75] Inventor: Claude Gillet, Ferrieres, France

[73] Assignee: Association pour la Rationalisation et la Mecanisation de l'Exploitation Forestiere ARMEF, Paris, France

[21] Appl. No.: 412,314

[22] Filed: Sep. 26, 1989

[30] Foreign Application Priority Data

Sep. 27, 1988 [FR] France ............... 88 12610

[51] Int. Cl.⁵ ............................. B62D 55/30
[52] U.S. Cl. ........................ 305/10; 305/24; 305/31
[58] Field of Search ........... 305/10, 21, 24, 27, 305/28, 29, 31, 32

[56] References Cited

U.S. PATENT DOCUMENTS 3,310,127  3/1967  Siber et al. ............... 305/10 X
3,375,944  4/1968  Bexten .
3,720,277  3/1973  Masaoka ................. 305/24 X
4,458,954  7/1984  Haas ....................... 305/10

FOREIGN PATENT DOCUMENTS 0065592   5/1981  European Pat. Off. .
1555539  11/1970  Fed. Rep. of Germany .
2502573  10/1982  France .
0724382   3/1980  U.S.S.R. ................. 305/28
0740588   6/1980  U.S.S.R. ................. 305/27
1239021   6/1986  U.S.S.R. ................. 305/24

Primary Examiner—Russell D. Stormer
Attorney, Agent, or Firm—Hoffman, Wasson & Gitler

[57] ABSTRACT

The invention relates to a self-propelled machine with flexible caterpillar treads maintained in position by guide wheels (5-8). The two guide wheels of each end are mounted on a rocker (15-24) whose of oscillation (17,25) is different from the axes of rotation of the wheels carried by it, and at least one of these rockers is equipped with a device (18-23) able to oppose its oscillation movement.

8 Claims, 1 Drawing Sheet

SELF-PROPELLED MACHINE WITH FLEXIBLE CATERPILLAR TREAD UNDERCARRIAGE

BACKGROUND OF THE INVENTION

This invention relates to a self-propelled machine with flexible caterpillar tread undercarriage, intended, among other things, for the forestry industry.

Various self-propelled machines with caterpillar treads are known, particularly in public works where they are used to carry and run tools such as shovels, loaders or scrapers.

The main disadvantage of such machines is that they are equipped with rigid caterpillar tread undercarriages so that they can run practically only on surfaces that are relatively flat and even suitable for vehicle traffic.

There are also self-propelled caterpillar tread machines in the forestry industry. But most of these machines are also rigid caterpillar tread machines, which makes it impossible to use them on rough terrain such as uncultivated terrain with rocks or stumps which protrude from the ground.

While caterpillar tread machines equipped with flexible caterpillar tread undercarriages and used in forestry can run on rough terrain, this is no longer the case on a longitudinal gradient or even less so on a down slope.

Finally there are military caterpillar tread machines able run on rough terrain even on a significant longitudinal gradient or on a down slope. But they are not designed to limit possible damage to the ground.

SUMMARY OF THE INVENTION

The object of this invention is to propose a self-propelled machine with flexible caterpillar tread undercarriage usable on any terrain even with a significant longitudinal gradient and/or down slope, while sparing the ground as it passes over.

Such a machine comprises two caterpillar treads maintained by guide wheels both of which are mounted on each end on a rocker whose axis of oscillation is different from the axes of rotation of the wheels carried by it, at least one of these rockers being equipped with a device able to oppose its oscillation movement so as to adapt the operating conditions of the caterpillar treads to the stresses they undergo.

According to a second characteristic of the invention, the device able to oppose the oscillating movement of one of the end rockers is controlled by an inclinometer that measures the incline of the machine, so as to take account of the particular stresses due to this inclination.

According to a third characteristic of the invention, the angular travel of the rockers is limited.

According to a fourth characteristic of the invention the machine has two systems to ensure different tensions of the caterpillar treads depending on whether it is running forward or in reverse.

BRIEF DESCRIPTION OF THE DRAWING

Other characteristics and advantages will appear in the course of the following description of an embodiment of the example given as an indication and in no way limiting, in relation to the accompanying figure on which one side of a caterpillar tread undercarriage equipping a machine according to the invention is shown diagrammatically in longitudinal view, accompanied by two hydraulic diagrams applying to said caterpillar tread undercarriage.

DESCRIPTION OF THE PREFERRED EMBODIMENT

Figure 1:
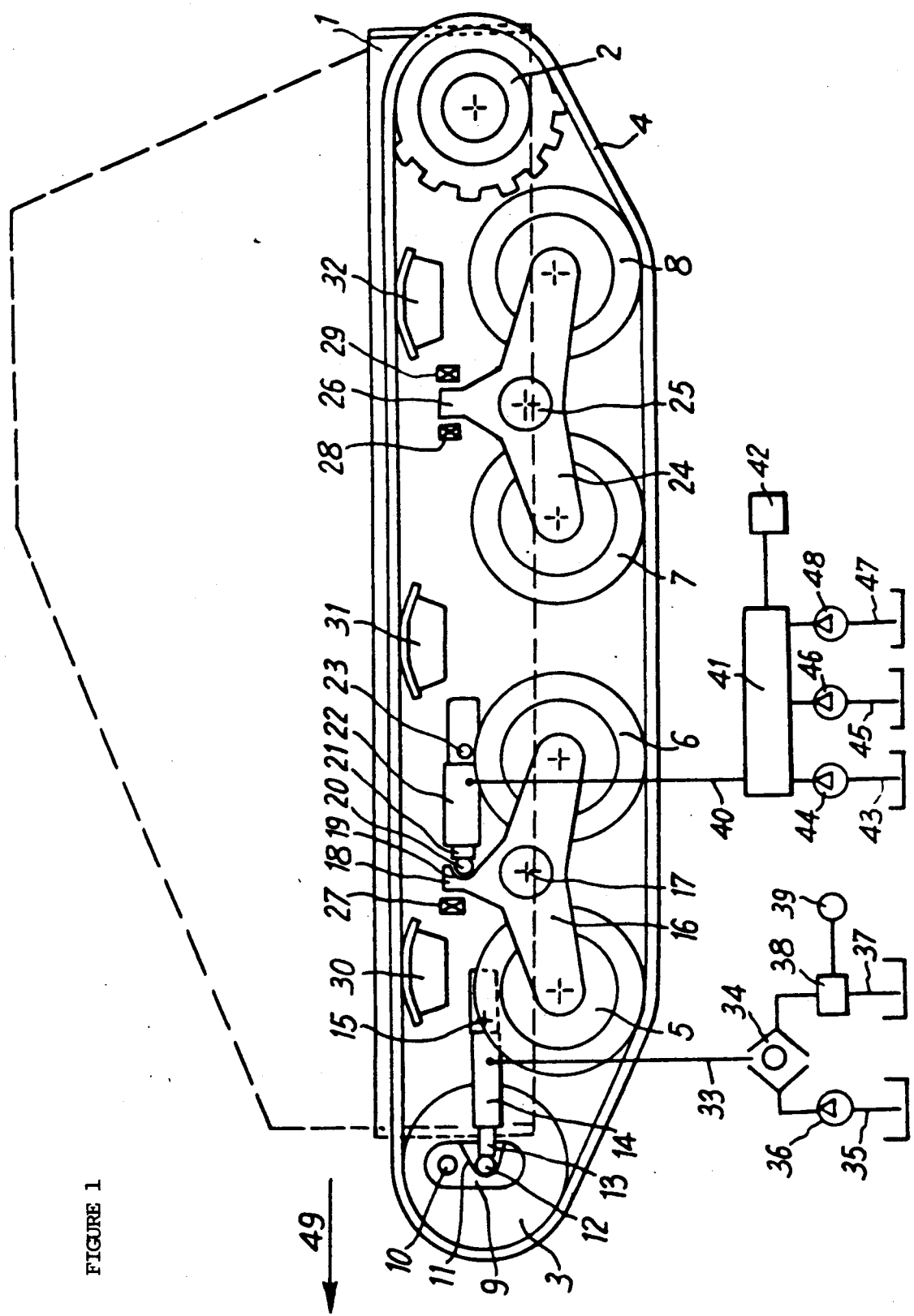

Frame 1 carries drive sprocket wheel 2, tension pulley 3, caterpillar tread 4 and four guide wheels 5, 6, 7 and 8.

Drive sprocket wheel 2 is mounted directly on frame 1 while tension pulley 3 is mounted on swinging part 9 that swings freely around pin 10 that is stationary in relation to frame 1.

This part 9 carries an extra thickness exhibiting notch 11 at the bottom of which head 12 of rod 13 of cylinder 14 whose body is jointed on pin 15 that is stationary in relation to frame 1 comes to rest.

Two guide wheels 5 and 6 are mounted on rocker 16 swinging around axis 17, with the distance from rotation axis of wheel 5 to axis 17 being greater than the distance from rotation axis of wheel 6 to said axis 17.

Rocker 16 carries arm 18 with notch 19 at the bottom of which head 20 of rod 21 of second cylinder 22 whose body is jointed on pin 23 that is also stationary in relation to frame 1 comes to rest.

Two guide wheels 7 and 8 are mounted on rocker 24 swinging around axis 25 and carrying arm 26. The distance from the rotation axis of wheel 8 to axis 25 is greater than the distance from the rotation axis of wheel 7 to said axis 25.

To frame 1 are attached three stops 27, 28 and 29 and three slides 30, 31 and 32.

The hydraulic feeding diagram of cylinder 14 comprises line 33 connected to selector 34 served, on the one hand, by a circuit with constant low pressure comprising line 35 and pump 36 and on the other hand by a variable pressure circuit comprising line 37 and pump 38 controlled by detector 39 that measures the stresses transmitted by the caterpillar tread.

The hydraulic feeding diagram of cylinder 22 comprises line 40 connected to slide valve electrodistributor 41 with three positions controlled by inclinometer 42 and connected to a low pressure circuit comprising line 43 and pump 44, to a medium pressure circuit comprising line 45 and pump 46 and to a high pressure circuit comprising line 47 and pump 48.

Under these conditions, the functioning is set up as described below.

On flat terrain and in forward gear (arrow 49), two cylinders 14 and 22 are at low pressure, with cylinder 14 being fed from line 35 through selector 34 and line 33, while cylinder 22 is fed from line 43 through electrodistributor 41 and line 40.

The lever arm difference between the rotation axis of wheel 5 and the axis of rocker 16 and between the rotation axis of wheel 6 and same axis 16 causes the pressure of the weight of the machine to be higher on the axis of wheel 6 than on that of wheel 5.

This difference in pressure, partially compensated by the pressure exerted by head 20 of rod 21 of cylinder 22 precisely makes it possible always to keep said head 20 in contact with the bottom of notch 19 on arm 18 of rocker 16 not only without creating excessive pressure on the ground at a right angle to wheel 5 in relation to wheel 6 but by maintaining a slight underpressure. This permanent contact ensures cooperation without jolts between the two parts, even though there is no mechanical joining between them.

The slight underpressure at a right angle to wheel 5 in relation to the pressure at a right angle to wheel 6 is advantageous both in normal movement and during the rotation of the machine on itself.

In normal movement the contact of the caterpillar treads with the ground is progressive, which also ensures a progressive grip with the ground, and thus less damaging, and during the rotation of the machine, this progressive grip lessens the scraping of the ground in the peripheral area swept by the caterpillar treads.

If an obstacle arises in front of guide wheel 5, this wheel is lifted, which tends to cause an angular displacement of rocker 16 and thus of arm 18 which exerts a certain pressure on head 20 of piston rod 21 of cylinder 22. But this possible displacement is increasingly counteracted by the pressure existing in line 40.

If the obstacle reaches a certain height, the angular displacement of the rocker is limited by the travel of piston rod 21 in cylinder 22 and the lifting of wheel 5 is thus also limited, both to maintain on the ground a minimum surface of the caterpillar tread and to ensure the correct tension of the caterpillar tread without excessive movement of tension pulley 3. For this reason, from a certain lifting value, the whole machine will possibly slant.

When the obstacle has been cleared by wheel 5, it comes up in front of wheel 6 which will be lifted by the same value as the first wheel. It is not necessary to have a special device to absorb this lifting, since absorption is caused by the pressure of the machine exerted on wheel 5 and this pressure counteracts the angular displacement of rocker 16 caused by the lifting of wheel 6. Stop 27 limits the angular displacement of rocker 16.

Then the obstacle comes up in front of wheel 7 whose lifting is counteracted by the pressure of the machine on wheel 8 and limited by stop 28.

No special device is provided to absorb lifting of wheel 8, since this absorption is obtained by the tension exerted by sprocket wheel 2 on the half of the caterpillar tread between it and wheel 8, with stop 29 ensuring the limitation of this lifting.

It is obvious that the machine is equipped on the other side with another identical caterpillar tread and driven in the same way, with each of the caterpillar treads working independently of one another.

During the clearing of obstacles, the tension of the caterpillar tread has not changed, with cylinder 14 remaining fed at all times by low pressure line 35.

Let us now imagine that the machine has to clear the same obstacle as before, but in reverse. The problems to be solved are completely different.

First of all, the traction of caterpillar tread 4 by sprocket wheel 2 is no longer exerted by the lower half of the caterpillar tread, but by its upper half, i.e, by the one that rests on guides 30, 31, and 32. This upper half is thus taut while the lower half becomes the slack half, which runs the risk of causing the caterpillar tread to come loose. To avoid this risk, when it is thrown into reverse the position of selector 34 is reversed which then feeds line 33 from line 37 and from pump 38, since the delivery of this pump is a function of the indications provided by detector 39 so as to make the caterpillar tread increasingly taut when the stresses developed by the caterpillar tread increase, and to lessen this tension when said stresses decrease.

Nothing is changed in the functioning of cylinder 22 and guide wheels 5 to 8. When wheel 8 passes over the obstacle, its lifting necessitates no particular absorption because of the proximity of sprocket wheel 2 on which the caterpillar tread engages and just as when the obstacle is clear in forward gear, this lifting is limited by stationary stop 28.

The passing of wheels 7, 6 and 5 over the obstacle is achieved just as in forward gear, i.e., with the lifting of wheel 7 being absorbed by the pressure of the machine on wheel 8, with the lifting of wheel 6 being absorbed by the pressure of the machine on wheel 5 and the lifting of wheel 5 being absorbed by cylinder 22.

Engagement into reverse gear again puts cylinder 14 into communication with constant low pressure line 35.

Let us now imagine that the machine is advancing on a slope. Here again the operating conditions will change, and even more the steeper the slope. Actually, the inclination of the machine displaces the vertical of the center of gravity on the support polygon toward guide wheels 5 and 6. The balance of the machine is thus modified, particularly by the overload received by wheels 5 and 6.

To compensate the effects of this imbalance the machine is equipped with inclinometer 42 which constantly measures the position of the machine in relation to the vertical and which acts on electrodistributor 41 as a function of the inclination it detects.

When the inclination reaches 10°, electrodistributor 41 puts line 40 that serves cylinder 22 into communication with medium pressure circuit 45: this raising of the pressure in cylinder 22 will compensate the overload received by wheel 5 in relation to wheel 6 because of the inclination of the machine, and will take part in the tension of caterpillar tread 3 while maintaining its normal profile.

When the inclination exceeds 15°, electrodistributor 41 puts line 40 into communication with high pressure circuit 47 whose value makes it possible to maintain the rocker in a position short of the end-of-travel position of rod 20, despite the pressure exerted by the overload because of the inclination of the machine.

These increases in pressure in cylinder 22 up to the quasiblocking of the rocker exhibit another advantage which is that of increasing the stability of the machine.

Actually, the point of normal tilting of the machine is reached when the vertical of the center of gravity of the machine passes through axis 17 of rocker 16. But when the latter is maintained by the effects of the high pressure, counter to those of the weight of the machine, the point of tilting will be reached only when the vertical of the center of gravity of the machine passes through the axis of wheel 5. Thus the stability of the machine is thereby increased as compared to a machine not having any device able to oppose the oscillation of rocker 16.

If, once the machine has moved forward on a slope, it is desired to go back up the same slope in reverse, the engaging of reverse gear, as explained above, will make tension cylinder 14 move into high pressure, but this will not change anything in the operation conditions of cylinder 22 which remains in high pressure until the inclinometer has detected the decrease and then the disappearance of the inclination of the machine.

When the machine moves forward uphill, there is no need take any special precaution since the pressure exerted by the machine on wheels 5 and 6 only increases the adherence of the caterpillar tread on the ground at their level and favors the displacement of the machine. Moreover, cylinder 22 plays its role more easily than if the machine were on a horizontal plane, since wheels 5 and 6 are subject to less pressure.

If the machine is then made to move downhill in reverse, the problems are the same as for moving uphill in forward gear and cylinder 22 can thus remain in low pressure. By itself cylinder 14 will be put in high pressure to face the problems inherent in operation in reverse explained above.

Of course, is possible, without going outside the scope of the invention, to modify design and/or construction details to achieve the same result.

For example, in the case of hydraulic drive of the caterpillar treads, the operation of pump 38 could be connected to the hydraulic drive circuit of the caterpillar treads and then detector 39 could be eliminated.

Rocker 24 could also be equipped with an anti-oscillation device identical or analogous to that of rocker 16, for example if a working tool should be mounted on the machine on the side of sprocket wheel 2.

I claim:

1. A self-propelled machine with flexible caterpillar treads maintained in position by a first set of guide wheels located at one end of said machine and a second set of guide wheels located at a second end of said machine, characterized in that both sets of guide wheels are mounted on a rigid rocker whose axis of oscillation is different from the axes of rotation of the wheels carried by it and wherein at least one of these two rockers is equipped with a device able to oppose its oscillation movement.

2. A machine with caterpillar treads according to claim 1, wherein the device able to oppose the oscillation movement of at least one rocker is controlled by an inclinometer (42) measuring the inclination of the unit in relation to the vertical.

3. A machine with caterpillar treads according to claim 2, wherein the device able to oppose the oscillation of at least one rocker counteracts by pressure oscillation of said rocker as an inclination of the unit increases.

4. A machine with caterpillar treads according to claim 1, wherein angular displacement of the rockers is limited.

5. A machine with caterpillar treads according to claim 1, wherein on the end rockers, the distance from the axis of rotation of the outer guide wheel to the axis of oscillation of the rocker on which it is mounted is greater than the distance from the axis of rotation of the inner wheel to said axis of oscillation.

6. A machine with caterpillar treads according to claim 1, wherein it includes means to assure at least two different tensions to each of the caterpillar treads.

7. A machine with caterpillar treads according to claim 6, wherein the placing of the caterpillar treads into slight tension is automatically linked to the engagement of the forward gear on the machine and that their placing into great tension is automatically linked to the engagement of the reverse gear.

8. A machine with caterpillar treads according to claim 7 wherein it is equipped with means (39) that increase the tension of the caterpillar treads as a function of the stresses they develop when the machine is in reverse gear.

* * * * *